Nov. 6, 1951     E. A. ALLEN     2,574,430
SYNCHRONOUS MOTOR CLOCKWORK
Filed Dec. 6, 1948
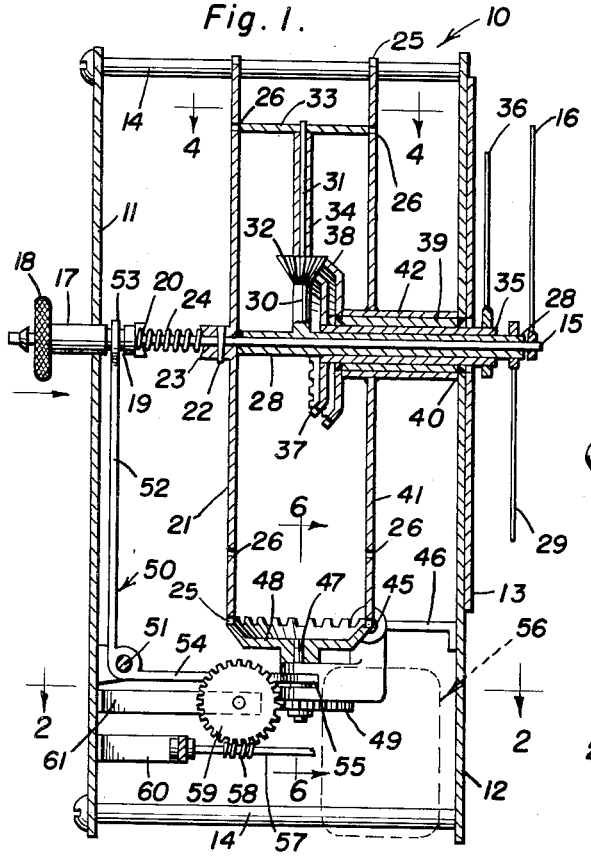
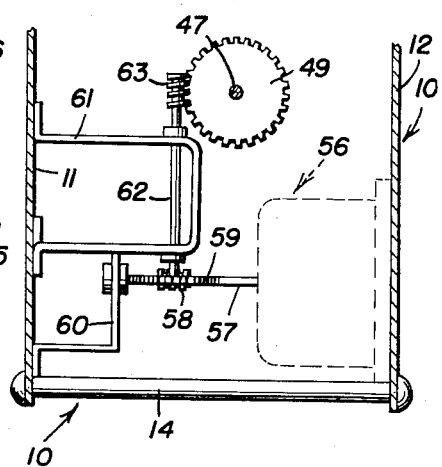
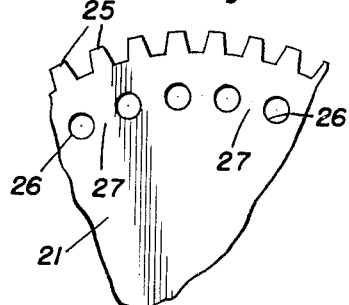
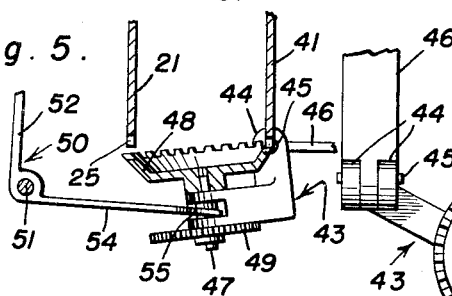
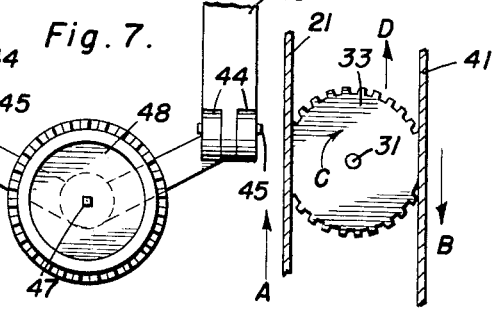
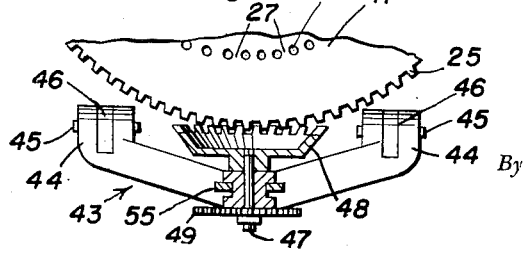
Inventor
Edgar A. Allen
By Clarence A. O'Brien and Harvey B. Jacobson
Attorneys Patented Nov. 6, 1951

2,574,430

UNITED STATES PATENT OFFICE 2,574,430

SYNCHRONOUS MOTOR CLOCKWORK

Edgar A. Allen, Wheelersburg, Ohio

Application December 6, 1948, Serial No. 63,663

14 Claims. (Cl. 58—26)

This invention relates to certain new and useful improvements in clock mechanisms and the general or broad objective is to structurally, functionally, and otherwise improve upon and simplify the overall construction of such a mechanism through the adoption and use of a novel and practical mechanical motion.

More particularly, I have evolved and produced a highly satisfactory clockwork or mechanism which, compared to conventional types known to me, is easier to manufacture and build in that all essential parts and elements, beyond the power drive (electric motor or spring motor, as the case may be) are systematically assembled on and around a horizontal linearly straight shaft, the latter in operation, being the second hand arbor or spindle.

A further object is to provide a structure, as stated, which is ingenious and aptly suited to attain wanted ends in that, through a consolidation of mechanical elements, it obviates the need for numerous customary counter-shafts and needless complemental gears.

Another object of the invention is realized through the adoption and use of systematized and properly co-ordinated means which allows the prime mover, electric or spring type, to keep running during the period the hands are being set.

In carrying out my aims, I provide the aforementioned single and simple sweep hand shaft and, on said shaft, I assemble a relatively rotatable tubular shaft operating the minute hand, said tubular shaft serving as a mount and bearing for a surrounding second tubular shaft carrying the hour hand. The second named tubular shaft is surrounded by a third tubular shaft or sleeve which is fixed on the framework and said third tubular shaft provides a support for a stationary tracking gear, crown type, and, in addition provides a bushing and bearing for a tubular hub, the latter provided with an integral sun gear.

Further, and in conjunction with said multiple assemblage of consolidated shafts, I employ a second sun gear opposed in parallelism to the first sun gear, said second sun gear being keyed to the solid sweep hand shaft for rotation with the latter, and providing a novel adaptation to properly accommodate and support a unique planetary gearing arrangement.

Then, too, novelty has to do with a pivotally mounted crown gear—the driver here—which normally meshes with the two sun gears in a manner to drive the latter and which receives its motion, through speed reducing gears, from the prime mover, said driver being pivotally and swingably mounted so that it functions to permit the hands to be set while, at the same time, allows the prime mover to keep right on running.

In addition, it is submitted that novelty, patentably speaking, resides in an open framework, of common form, wherein the stated sweep hand shaft or spindle is mounted horizontally for rotation in spaced parallel plates of said framework, said shaft serving as the sole support for the aforementioned plurality of interfitting tubular shafts and also as a support for the differential-type planetary gearing arrangement, whereby to provide an assemblage wherein manufacturers will find their needs fully met, contained and conveniently available for assembling, adjusting and repair work. Further, exceeding care has been exercised, it is submitted, in embodying in my improved structure all worthy requirements for such purposes.

Other objects, features and advantages will become more readily apparent from the following description and the accompanying illustrative drawings.

In the drawings:

Figure 1 is a view primarily in section, with parts in elevation, showing a clockwork constructed in accordance with the principles of the present invention and showing the essential parts in their normal or running positions;

Figure 2 is a fragmentary horizontal section on the line 2—2 of Figure 1, looking in the direction of the arrows;

Figure 3 is a fragmentary elevational view of one of the aforementioned sun gears;

Figure 4 is a fragmentary horizontal sectional view on the line 4—4 of Figure 1, looking in the direction of the arrows;

Figure 5 is a view, in section and elevation, showing portions of the two sun gears and the single crown-type driving gear, the latter "dropped" and angled to a position where it is engaged with one sun gear and disengaged from the other sun gear, this for purposes of setting the clock.

Figure 6 is a view taken on the vertical line 6—6 of Figure 1, looking in the direction of the arrows;

Figure 7 is a fragmentary plan view of the driving gear and supporting yoke for same.

Briefly, and by way of introduction to the detailed description, the invention is characterized by a framework, somewhat conventional in nature, the same including spaced parallel plates, one plate carrying the usual dial with which the second, minute, and hour hands coact. Mounted centrally and horizontally for rotation in and between the plates is the aforementioned second hand shaft and keyed to this, at the left in Figure 1, is one of the sun gears. To the right of the sun gear and surrounding the shaft is a tubular shaft carrying the minute hand. Surrounding said minute hand shaft is a second tubular shaft carrying at its inner end a united crown gear, the latter being rotatable. Surrounding the second named tubular shaft is a third tubular shaft which may be identified as a sleeve and this is fixed to the frame and carries a unified crown gear in spaced parallelism with the first named crown gear. Then, surrounding said sleeve is the hub of the second sun gear, the latter being parallel to the first named sun gear. A powered drive gear meshes with the teeth on the spaced parallel sun gears, the drive gear receiving motion from a synchronous electric motor or, a spring motor (not shown) as the case may be. Here, an electric motor is used. Situated between the vertical sun gears is a horizontal planetary gear journaled for rotation on a spindle. On the same spindle is a free turning bevel gear whose teeth mesh conjointly with the teeth of the two adjacent crown gears, said bevelled gear being mounted for movement with the first named tubular shaft for purposes of turning the latter.

I provide special mounting means for the drive gear so that latter may be adjusted to properly set the hands of the clock, which mechanism will be explicitly set forth in the following description.

The main support takes the form of a framework which is denoted, generally, by the numeral 10 and is characterized by spaced parallel plates 11 and 12, the latter being the front plate and provided with a conventional type clock dial 13. Assembling and retaining rods or the like, at 14 serve to assemble the plates 11 and 12. Obviously, the framework may be of any suitable construction to accommodate my improved clockwork or mechanism.

A significant part of the mechanism is the solid central horizontally disposed shaft 15, this being mounted for rotation and carrying the second hand or pointer 16 which is parallel to and sweeps around the dial 13. The opposite or left hand portion of the shaft 15 is journaled for rotation in the hollow stem portion 17 of a finger knob 18 which knob has a running fit on said shaft. The stem has a reduced portion at 19 and carries a clutch element 20. The numeral 21 designates a sun gear whose hub portion is pinned as at 22 on the shaft 15, said hub having a clutch element 23. A coiled spring 24 surrounds the shaft 15 and is interposed between the two clutch elements. By pressing the knob 18 in the direction of the adjacent arrow the clutch elements may be brought into engagement in an obvious manner. The clutch elements will be made to permit the coiled spring to properly compress without interfering with proper engagement of said elements. Reverting to the sun gear 21 this has marginal or peripheral teeth and in the present arrangement it is provided with 116 teeth denoted by the numeral 25. Said gear is also provided with cogwheel holes 26 and intervening webs 27. There are thirty holes 26 and they are at circumferentially spaced equi-distant points about the diameter of the sun gear. The holes are drilled so that their webs 27 (Figure 3) equal the diameters of the holes and thus serve a purpose to be hereinafter described.

I next call attention to numeral 28 which denotes a tubular shaft, said tubular shaft being rotatable on the solid shaft 15 and being provided on its outer or right hand end with a pointer or so-called minute hand 29 coacting with the hand 16 and also with the dial 13. At the inner or left hand end portion said tubular shaft 28 is in rotatable contact with the hub portion of the sun gear 21 and the portion of said shaft adjacent said sun gear is provided with an integral lateral arm 30 provided with a reduced spindle 31 parallel to said sun gear. Mounted for free rotation on the spindle is a beveled gear 32 and mounted for free rotation on the outer end of the spindle is a cogwheel 33 whose teeth coact with the holes 26 and intervening webs 27. The numeral 34 designates a spacing sleeve on the spindle between the gears 32 and 33. The arm 30, spindle 31, gear 32, gear 33 and spacing sleeve form a novel planetary unit which revolves through an orbital path while permitting the gears 32 and 33 to rotate on their respective axes.

A second hollow or tubular shaft is denoted by the numeral 35 and this surrounds the first hollow shaft 28 and is provided at its outer end with a pointer constituting the hour hand 36. On its inner end said shaft 35 is provided with a crown gear 37, the gear being integral with the shaft and having thirty-three teeth. The teeth are enmeshed with the teeth of the beveled gear 32. Spaced from and opposed in parallelism to the crown gear 37 is a second crown gear 38 having thirty-six teeth and mounted rigidly on a sleeve 39, said sleeve being, in turn, rigidly connected to the framework at 40. The beveled gear 32 has its teeth enmeshed with the teeth of the crown gear 38 and, in action "rolls" around said fixed crown gear 38.

Next, I call attention to the second sun gear 41 which is in opposed and spaced parallelism in respect to the complemental sun gear 21, the same having a hub 42 which is mounted for free rotation on the fixed sleeve 39. The hub is interposed between the crown gear 38 and plate 12 and, as stated, is freely rotatable. The sun gear 41 has one hundred and twenty teeth and is also provided with the same number of holes (thirty). For convenience these holes will be the same as those shown in Figure 3 wherein same are identified by the numeral 26, the webs at 27. Thus, the sun gears are somewhat the same in construction, the gear 21 having 116 teeth and the gear 41 having 120 teeth and both gears having 30 equi-distant holes to accommodate the teeth of the cogwheel 33. The cogwheel is fitted between the sun gears as shown in Figure 4.

Referring now to Figures 5, 6 and 7 the numeral 43 denotes a substantially V-shaped yoke the outer ends of the arms of which have hinging and assembling ears 44 hingedly connected, as at 45 on the coacting end portions of bracket arms 46 rigidly mounted on the inner surface of the plate 12. The yoke serves as a hanger for a vertical stub shaft 47 having keyed thereon a crown-type driver or drive gear 48. The stub shaft is mounted in suitable bearings provided in the yoke and also has keyed on its lower end a speed reducing worm wheel 49. It will be noted that the yoke pivots on an axis which passes through the contact of the pitch lines of gears 48 and 41 respectively. The action of the aforementioned spring 24 serves to keep the drive gear 48 in constant mesh with sun gears 21 and 41 and this is accomplished through the adoption and use of a simple bell crank 50 which is hingedly mounted on the plate 11 as at the point 51. The vertical arm 52 of the bell crank has a fork 53 fitting in the reduced portion of the stem 17. The remaining arm 54 has a fork 55 which straddles the stub shaft 47 as shown in Figure 1 and especially in Figure 5. The connection between said fork and stub shaft is such as to allow the relative angular disposition of parts as brought out to advantage in Figure 5.

Attention comes now to the prime mover which is denoted by the numeral 56. The prime mover is here shown in the form of a suitably mounted synchronous motor. The shaft 57 from the motor (see Figure 2) turns at the rate of 3600 R. P. M. Shaft 57 has a single worm 58 enmeshed with a vertical worm wheel 59, left hand end of the shaft journalled in the bearings provided therefor in a suitable brace or bracket 60 carried by plate 11. A similar U-shaped bracket is denoted at 61 and this is on a slightly elevated plane and provides bearings for a second speed reducing shaft 62. The shaft 62 carries the worm wheel 59 and is provided with a single worm 63 in mesh with the aforementioned worm wheel 49 on stub shaft 47, all as shown in Figure 2. As stated, the drive gear 48 is normally in mesh with the sun gears 21 and 41 and is held in this engaged position by way of the bell crank and spring means. The same spring means and bell crank serves to permit the operation shown in Figure 5 to be attained wherein the driver 48 is tilted by the downward swing of the bell crank arm 54 at which time the drive gear 48 stays in locking mesh with the sun gear 41 to prevent the latter from turning. This is necessary when the clock is being set. At the same time the worm wheel 49 is disengaged from the worm 63 and the motor is left running. I might point out, at this stage, that the double worm wheel combination serves to reduce the speed from the motor by a ratio of 900 to 1. It follows that the driver 48, which has 29 teeth, turns at 4 R. P. M.

Since the beveled pinion or drive gear 48 has 29 teeth and turns at 4 R. P. M. I multiply 29 times 4 to attain the 116 teeth in the sun gear 21 and multiply 30 times 4 to attain the 120 teeth in the sun gear 41. I might point out too that the number of teeth in the cogwheel 33 is unimportant and that the number of teeth in the bevel gear 32 is also unimportant. I would add that the worm wheels 59 and 49 have 30 teeth each which accounts for the stated 900 to 1 reduction in speed between the motor and 29-toothed pinion or gear 48.

Normal operation

As stated, the source of power is a suitable prime mover, here the synchronous motor 56. Said motor delivers motion to a single worm shaft 57 at the rate of 3600 R. P. M. The latter drives the 30-toothed worm wheel fixed on the second single worm shaft 62 which, in turn, turns the second 30-toothed worm wheel 49 fixed on the vertical so-called drive shaft 47. This double worm wheel combination reduces the given speed by 900 to 1 and hence the driver, the 29-tooth bevelled crown gear 48 turns at 4 R. P. M. Said crown gear simultaneously rotates the 116-toothed sun gear 21 in a clockwise direction and the 120-toothed sun gear 41 in a counterclockwise direction (looking from right to left in Figure 1). Since sun gear 21 is fixed to the second hand shaft 15 it rotates the latter one revolution per minute, obviously. The revolvable planetary gear train or assembly, cogwheel 33 and the idling bevelled pinion 32, revolves through an orbital path between said sun gears 21 and 41. As previously stated, it is the duty of said cog wheel 33 and bevelled pinion 32 to "walk" around and thus swing the arm 30 and its spindle 31 continuously, but progressively through 360 degrees and so, when the sun gear 21 makes one complete revolution, the arm 30 moves 6 degrees (360÷6=60), thus turning the minute hand 29 through its shaft 28 one graduation on the dial. At the end of one hour (60×6) the arm 30 will have made one complete revolution. It follows, too, that the bevelled pinion 32 is rolling ever so slowly around the fixed 36-toothed tracking crown 38 and, being in mesh with 33-toothed crown gear 37 the latter rotates the shaft 35 and its accompanying hour hand 36 one stage at a time till, at the end of 12 hours it will have rotated one complete revolution.

In connection with the given operation it will be clear that the 30 cogwheel holes 26 and 30 intervening webs 27 provide the 60 degrees required on sun gear 21 and since the sun gear 41 turns in an opposite direction when 30 holes in gear 21 pass a given point, 29 holes in gear 41 pass the same point, giving the desired differential motion to the planetary assembly, cogwheel 26 and its component parts. Also the 36 teeth on fixed gear 38 and the 33 teeth on gear 37 give the desired ratio of 11 to 12.

As touched upon previously, the prime mover could be, obviously, a suitable spring motor with attending escapement means; and, the speed reducing gear between said prime mover and drive gear 48 could be constructed otherwise than shown and precision-made to attain wanted ends. What I am chiefly concerned with, is the differential-type planetary gearing means, its organization in combination with the second, minute and hour hand shafts, plus the novel structure whereby the clock may be set.

To set the clock

It will be evident that, when setting the hands of the clock, it is necessary to press the knob 18 in and to compress spring 24 and engage clutch elements 20 and 23 thus causing the sun gear 21 and its shaft 15 to rotate in unison. In so doing the bell crank pivots at 51 and the fork 55 on arm 54 tilts the drive gear assembly 48 on pivot means 45 as shown in Figure 5. Since the sun gear 41 has to stay put while the clock hands are being set, the teeth on drive gear 48 stay in mesh with the teeth on same, and hold gear 41 steady. The worm wheel 49 disengages from the worm 63 and the motor keeps right on running, as is obvious. Thus, with the attitude of gears, as seen in Figure 5, the turning of knob 18 and shaft 15 operates all shafts in requisite order and sequence to establish the desired positions of the clock hands.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

Having described the invention, what is claimed as new is:

1. A clockwork construction of the class described comprising a framework including interconnected spaced parallel plates, a clock dial fixedly mounted on one of said plates, a horizontally disposed second hand shaft mounted for rotation in and essentially between said plates, a second hand carried by said second hand shaft and cooperable with said dial, a minute hand, means for rotatably mounting said minute hand on said second hand shaft, an hour hand, means mounting said hour hand for operation from said second hand shaft, a pair of spaced parallel sun gears supported between said plates by said second hand shaft, each sun gear having a predetermined number of teeth and the number of teeth on one sun gear differing from the number of teeth on the other sun gear, a drive gear in mesh with said sun gears, means for imparting rotation to said drive gear, said sun gears being further provided with equidistant circumferentially spaced openings concentric to the axis of rotation of said sun gears, a planetary cog between said sun gears having peripheral teeth engageable in said openings, and operating connections between said planetary cog and second, minute and hour hands, whereby the latter operate in predetermined sequential order in relation to said dial.

2. In a clockwork construction of the class described, a framework, a multiple shaft assembly supported for operation as a unitary structure on said framework and including independently operable hands, a pair of sun gears supported for operation on said shaft assembly, said sun gears having varying numbers of teeth, a single driving gear for simultaneously operating said sun gears, means on said framework for imparting motion to said drive gear, a pair of opposed parallel crown gears supported on said shaft assembly, one crown gear being fixed to said framework, the other crown gear being relatively movable, one crown gear having a greater number of teeth than the other crown gear, and an operating connection between said sun gears and crown gears including a planetary cogwheel in direct operating connection with said sun gears.

3. In a clockwork construction of the class described, a framework, a multiple shaft assembly supported for operation as a unitary structure on said framework and including independently operable hands, a pair of sun gears supported for operation on said shaft assembly, one sun gear having a lesser number of teeth than the other sun gear, a single driving gear for simultaneously operating said sun gears, means on said framework for imparting motion to said drive gear, a pair of opposed parallel crown gears supported on said shaft assembly, one crown gear being fixed, the other crown gear being relatively movable, one crown gear having more teeth than the other crown gear, and an operating connection between said sun gears and crown gears including a planetary cogwheel in direct operating connection with said sun gears, and a beveled gear simultaneously meshing with the teeth of said crown gears.

4. In a clockwork construction of the class described, a framework, a multiple shaft assembly supported for operation as a unitary structure on said framework and including independently operable hands, a pair of sun gears supported for operation on said shaft assembly, one sun gear having less teeth than the other sun gear, a single driving gear meshing with and simultaneously operating said sun gears, means on said framework for imparting motion to said drive gear, a pair of opposed parallel crown gears supported on said shaft assembly, one crown gear being fixed to the framework, the other crown gear being relatively rotatable, one crown gear having more teeth than the other crown gear, and an operating connection between said sun gears and crown gears including a planetary cogwheel in direct operating connection with said sun gears, and further including a beveled gear simultaneously meshing with the differential numbers of teeth on both crown gears, said bevelled gear being freely turnable and tracking around the fixed crown gear while serving to simultaneously impart rotation to the remaining crown rotatable gear.

5. In a clockwork construction of the class described, a framework, a foundational shaft horizontally disposed and mounted for rotation in said framework, a second hand carried by one end of said shaft, a dial on said framework with which said second hand is cooperable, a tubular shaft mounted for rotation on said first named shaft and provided with a minute hand cooperable with said dial, a lateral arm integrated with said tubular shaft, a beveled gear mounted for free axial rotation on said arm, a second tubular shaft rotatably surrounding the first tubular shaft and carrying an hour hand, a rotatable crown gear integrated with said second named tubular shaft and in mesh with said bevel gear, a sleeve surrounding said second named tubular shaft, a relatively stationary crown gear integrated with said sleeve, said sleeve being fixed to the framework, said second crown gear being in mesh with said beveled gear, said rotatable crown gear having less teeth than the stationary crown gear and intermeshing gear means supported from said foundational shaft and arm respectively for imparting motion to said foundational shaft, arm, first-named tubular shaft, said bevelled gear, rotatable crown gear, and second-named tubular shaft.

6. In a clockwork construction of the class described, a framework, a foundational shaft horizontally disposed and mounted for rotation in said framework, a second hand carried by one end of said shaft, a dial on said framework with which said second hand is cooperable, a tubular shaft mounted for rotation on said foundational shaft and provided with a minute hand cooperable with said dial, a lateral arm integrated with said tubular shaft, a beveled idling gear carried by said arm, a second tubular shaft rotatably surrounding said first named tubular shaft, a rotatable crown gear integrated with said second named tubular shaft and in mesh with said beveled gear, a sleeve surrounding said second named tubular shaft, a relatively stationary crown gear integrated with said sleeve, said sleeve being fixed to the framework, said second crown gear being in mesh with said beveled gear, said crown gears having a differential number of teeth, planetary gear means supported from said first named shaft for imparting rotation to said lateral arm and beveled gear, including a pair of spaced parallel sun gears having a differential number of teeth, a driving gear for said sun gears, means for imparting rotation to said driving gear, said planetary gear means also including a cogwheel simultaneously coacting with said sun gears and interposed between said sun gears, a spindle on said arm for mounting said planetary cogwheel, said cogwheel being journaled for rotation on said spindle, said crown gears, beveled gear and cogwheel being situated for operation between said sun gears.

7. A clockwork of the kind shown and described comprising a relatively stationary framework embodying spaced parallel plates, a conventional clock dial fixed on one of said plates, a primary shaft mounted horizontally for rotation on and essentially between said plates, a second hand carried by said shaft and cooperable, as usual, with said dial, a sun gear fixed on said shaft, a tubular shaft mounted for rotation on said first named shaft, a minute hand carried by said tubular shaft and coacting with said second hand and said dial, an arm fixed on said tubular shaft at right angles to the latter and parallel to said sun gear, said arm having a spindle, a bevelled gear freely rotatable on the inner end portion of said spindle, a cogwheel freely mounted for rotation on the outer end of said spindle, a spacer on the spindle between said cogwheel and bevelled gear, a second tubular shaft mounted for rotation on said first named tubular shaft and provided with an hour hand coacting with said second and minute hands and dial, a relatively rotatable crown gear fixed on the inner end of said second tubular shaft and in mesh with said bevelled gear, a sleeve surrounding said second tubular shaft, said sleeve being fixed to said framework, a relatively stationary crown gear fixedly mounted on said sleeve and in spaced parallelism with said first named crown gear, said crown gears having differing numbers of teeth, said bevelled gear being in mesh with said stationary crown gear and rolling around the latter and thus imparting rotation to the rotatable named crown gear, and a second sun gear opposed to said first sun gear and mounted for rotation on said sleeve, said sun gears having differing numbers of teeth, said cogwheel, bevelled gear and arm being between said sun gears and the latter having circumferentially spaced holes for reception of the teeth of said cogwheel, and a common driving gear having teeth in mesh with the differential teeth on said sun gears.

8. A clockwork of the kind shown and described comprising a relatively stationary framework embodying spaced parallel plates, a conventional clock dial fixed on one of said plates, a primary shaft mounted horizontally for rotation on and essentially between said plates, a second hand carried by said shaft and cooperable, as usual, with said dial, a sun gear fixed on said shaft, said sun gear having one hundred and sixteen teeth, a minute hand carried by said tubular shaft and coacting with said second hand and said dial, an arm fixed on said tubular shaft at right angles to latter and parallel to said sun gear, said arm having a spindle, a bevelled gear freely rotatable on the inner end portion of said spindle, a cogwheel freely mounted for rotation on the outer end of said spindle, a second tubular shaft mounted for rotation on said first named tubular shaft and provided with an hour hand coacting with said second and minute hands and dial, a rotatable crown gear fixed on the inner end of said second tubular shaft and in mesh with said bevelled gear, said crown gear having thirty-three teeth, a sleeve surrounding said second tubular shaft, said sleeve being fixed to said framework, a stationary crown gear fixedly mounted on said sleeve and in spaced parallelism with said first named crown gear, said stationary crown gear having thirty-six teeth, said bevelled gear being in mesh with said second crown gear and rolling around the latter and thus imparting rotation to the rotatable crown gear, and a second sun gear opposed to said first sun gear and mounted for rotation on said sleeve, said second sun gear having one hundred and twenty teeth, said cogwheel, bevelled gear and arm being between said sun gears and the latter having circumferentially spaced holes for reception of the teeth of said cogwheel, there being thirty equidistant holes in each of said sun gears, and a common driving gear for said sun gears.

9. The structure defined in claim 8, said driving gear having twenty-nine teeth.

10. The structure defined in claim 5, wherein said gear means embodies a pair of spaced parallel sun gears having differential numbers of teeth, a cogwheel mounted for idling on said arm, located between and operatively connected with said sun gears, a common driving gear normally in mesh with the teeth of said sun gears, and means on said framework for delivering motion to said driving gear.

11. The structure defined in claim 6, wherein said sun gears each have thirty equidistant circumferentially spaced holes, and the teeth of said cogwheel are engageable with said sun gears by way of said holes.

12. The structure defined in claim 7, wherein there are thirty equidistant holes in each sun gear.

13. The structure defined in claim 7, wherein each sun gear has thirty equidistant holes, said rotatable crown gear has thirty-three teeth, and said stationary crown gear has thirty-six teeth.

14. The structure defined in claim 8 and a synchronous electric motor operating at 3600 R. P. M., a source of power for said motor, and speed reducing gearing between said motor and driving gear, whereby the latter is driven at 4 R. P. M.

EDGAR A. ALLEN.

REFERENCES CITED

The following references are of record in the file of this patent:

UNITED STATES PATENTS

| Number | Name | Date |
|---|---|---|
| 1,827,179 | Whitehead et al. | Oct. 13, 1931 |
| 2,091,117 | Hayden | Aug. 24, 1937 |
| 2,303,365 | Karlsen | Dec. 1, 1942 |